United States Patent [19]
Feldman

[11] Patent Number: 5,946,071
[45] Date of Patent: Aug. 31, 1999

[54] EYEGLASSES WITH ILLUMINATED FRAME

[75] Inventor: Harold Feldman, Flushing, N.Y.

[73] Assignee: Live Wire Enterprises, Inc., Flushing, N.Y.

[21] Appl. No.: 09/114,869

[22] Filed: Jul. 14, 1998

[51] Int. Cl.[6] .................................................. G02C 1/00
[52] U.S. Cl. .............................. 351/41; 351/51; 351/158
[58] Field of Search ............................... 351/41, 158, 51, 351/52

[56] References Cited

U.S. PATENT DOCUMENTS

| | | | |
|---|---|---|---|
| 556,693 | 3/1896 | Quimby . | |
| 669,949 | 3/1901 | Underwood . | |
| 1,255,265 | 2/1918 | Zachara . | |
| 2,638,532 | 5/1953 | Brady | 240/59 |
| 2,904,670 | 9/1959 | Calmes | 240/2 |
| 3,060,308 | 10/1962 | Fortuna | 240/6.4 |
| 3,153,745 | 10/1964 | Gurian et al. | 315/206 |
| 3,549,878 | 12/1970 | Bailey | 240/10 |
| 4,234,907 | 11/1980 | Daniel | 362/32 |
| 4,254,451 | 3/1981 | Cochran, Jr. | 362/103 |
| 4,283,127 | 8/1981 | Rosenwinkel et al. | 351/158 |
| 4,652,981 | 3/1987 | Glynn | 362/103 |
| 4,687,306 | 8/1987 | Lipson et al. | 351/51 |
| 4,822,160 | 4/1989 | Tsai | 351/158 |
| 4,822,161 | 4/1989 | Jimmy | 351/158 |
| 4,828,355 | 5/1989 | Lipson et al. | 351/51 |

*Primary Examiner*—Hung Xuan Dang
*Attorney, Agent, or Firm*—Abelman, Frayne & Schwab

[57] ABSTRACT

An eyeglass frame includes an elongated flexible electroluminescent light source extending along a perimeter extent of the frame. A self contained voltage source is also carried by the eyeglass frame, together with a manually operable switch. When the switch is placed in the On position a continuous source of electroluminescent light will be emitted along the entire perimeter extent of the frame which includes the electroluminescent light source. A reflective surface may be provided along the rear of the eyeglass frame so that all the rays of the electroluminescent light source are forwardly directed.

16 Claims, 4 Drawing Sheets

EYEGLASSES WITH ILLUMINATED FRAME

The present invention relates to an illuminated eyeglass frame which includes an elongated flexible electroluminescent light source embedded within a perimeter extent of the frame to provide a light emitting region. A voltage source for energizing the electroluminescent light source is also provided on the frame, in conjunction with a manually operable switch means. A reflective surface may also be provided in the frame coextensive with the electroluminescent light source and located such that all of the light emitted by the electroluminescent light source will be forwardly directed away from the wearer's face.

BACKGROUND OF THE INVENTION

Various lighting arrangements have previously been proposed in conjunction with eyeglasses. These lighting arrangements have either been provided for a novelty effect, or to illuminate reading or other material in proximity to the eyeglasses. Such prior arrangements are typically in U.S. Pat. Nos. 669,949; 1,255,265; 2,638,532; 2,904,670; 3,060,308; 4,254,451; 4,283,127; 4,822,160; and 4,822,161. Such arrangements have generally been cumbersome, required associated structure in addition to the eyeglass frame, or included a plurality of spaced light sources (e.g., individual light bulbs or light emitting diodes within the frame).

While such eyeglass structures have generally acknowledged the desirability of including a light source in conjunction with eyeglasses, they have not enabled the simple incorporation within the eyeglass frame of a continuous flexible elongated light source which can be coextensive with a desired perimeter extent of the eyeglass frame.

SUMMARY OF THE INVENTION

The present invention incorporates an elongated flexible electroluminescent light source within the eyeglass frame. By virtue of its flexibility, the electroluminescent light source provides continuity of illumination along a desired perimeter extent of the eyeglass frame. Advantageously, the electroluminescent light source is embedded within a perimeter extent of the frontal portion of the eyeglass frame. If desired, the elongated flexible electroluminescent light source may be coextensive with the entire frontal portion of the eyeglass frame and even extend into the pair of side temples. The eyeglass frame also includes a voltage source to suitably energize the electroluminescent light source and a manual switch. The voltage source preferably includes a replaceable battery, and an inverter to convert the battery output to the requisite source voltage to illuminate the electroluminescent light source. Various alternative configurations are disclosed, which, by virtue of the flexibility of electroluminescent light source, readily permits continuous emission of light along the desired perimeter extent of the eyeglass frame.

Advantageously, a reflective surface may be provided within at least a portion of the eyeglass frame coextensive with the electroluminescent light source. The reflective surface will be located along the side of the eyeglass frame which is closest to the wearer's face. Hence, the reflective surface will reverse the light impinging thereon, directing it forward, where it will be additive to the light being emitted from the forward side of the electroluminescent light source, to illuminate reading or other material being viewed by the wearer. It will also minimize possible wearer disturbance, which might otherwise occur if the light is directed towards the wearer's eyes.

The flexible elongated illuminescent light source may be typically of the type disclosed in U.S. Pat. No. 5,485,355, and may be obtained from Elam, Har Hotzvim Post Office Box 45010, Jerusalem, 91450, Israel. The electroluminescent light source includes a pair of electrodes in proximity to electroluminophor powder, encased in a flexible transparent polyvinylchloride outer covering. The color of the light emitted by the light source, when appropriately energized, depends essentially on the type of electroluminophor powder used. It has been determined that a single AAA 1.5 volt battery, in conjunction with a miniature inverter, such as available from Inverter Designs, Lancaster, Tex. 75134, can provide the requisite energization of the electroluminescent wire. Thus, the illuminated eyeglass frame of the present invention, which includes an elongated flexible electroluminescent light source embedded therein, and coextensive with a desired perimeter extent of the frame, will be completely self contained.

Accordingly, an object of the present invention is to provide an eyeglass frame which includes an elongated flexible electroluminescent light source to provide a continuous path of illumination along a desired perimeter extent of the eyeglass frame.

Another object of the present invention is to provide such an eyeglass frame in which the electroluminescent light source is embedded within the frame.

A further object of the present invention is to provide such an eyeglass frame which also includes a compact energizing source for the electroluminescent light source, which comprises a battery and voltage inverter.

Yet another object of the present invention is to provide such an eyeglass frame in which the electroluminescent light source is coextensive with at least the major perimeter extent of the frontal lens carrying frame.

Yet a further object of the present invention is to provide such an eyeglass frame in which the elongated flexible electroluminescent light source also extends into the side temples.

Yet an additional object of the present invention is to provide such an eyeglass frame which includes a reflective surface in conjunction with the electroluminescent light source so as to forwardly direct all its illumination.

These as well as other objects of the present invention will become apparent upon a consideration of the following figures and detailed description.

DETAILED DESCRIPTION

Figure 1:
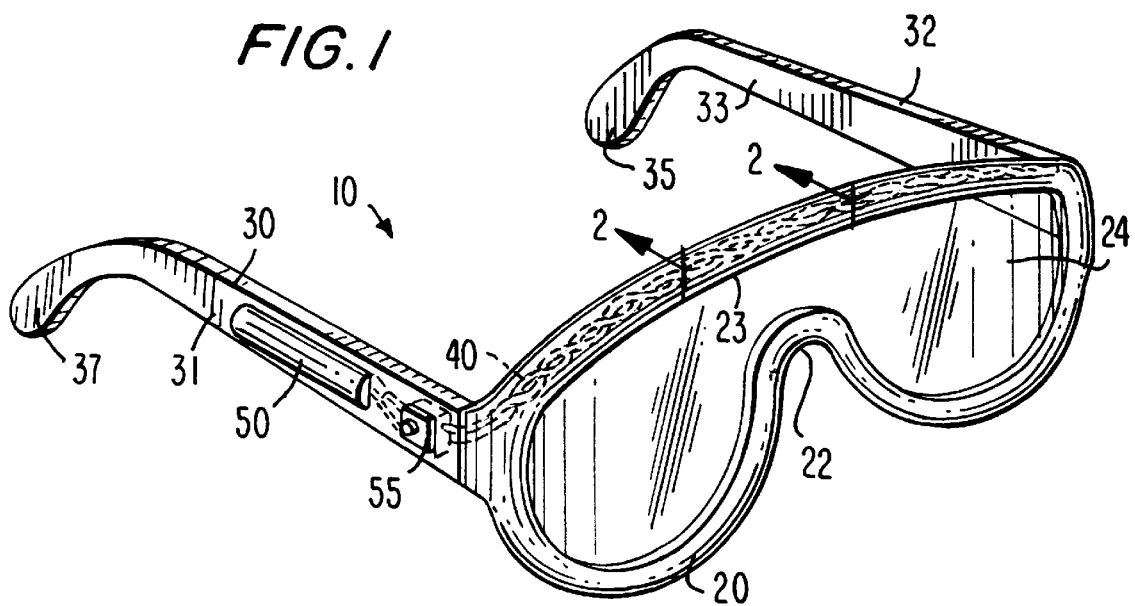
FIG. 1 is a perspective view showing one form of the illuminated eyeglass frame in accordance with the present invention.
Figure 2:
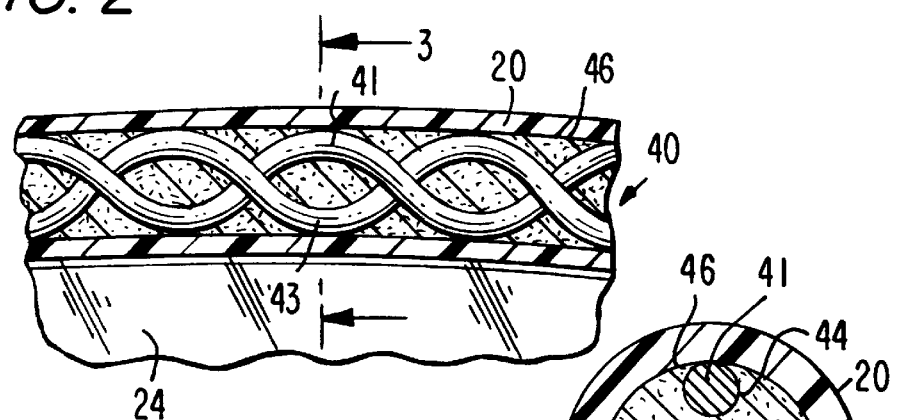
FIG. 2 is a cross-sectional view of FIG. 1 along the lines 2—2 and looking in the direction of the arrows.
Figure 3:
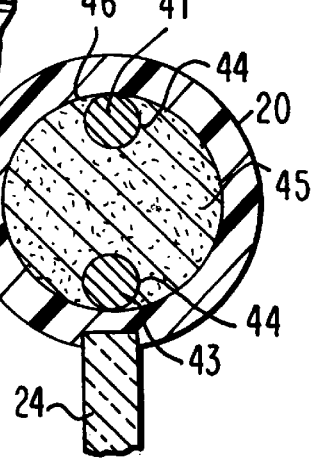
FIG. 3 is a cross-sectional view along the lines 3—3 of FIG. 2 and looking in the direction of the arrows.

Reference is initially made to FIGS. 1–3, which show a first embodiment of an eyeglass frame structure in accordance with the present invention. The eyeglass frame 10 includes a frontal lens carrying portion 20 and side temples 30, 32. The frontal lens carrying portion 20 and side temple pieces 30, 32 are preferably formed of plastic. The frontal lens carrying portion includes a nose bridge central section 22 and lens 24. Although a single lens 24 is shown as coextensive to both eye sections, a separate lens may be provided for each of the eyes, as shown by lens sections 24-1 and 24-2 of the alternative embodiments shown in FIGS. 5, 6, and 8. The side temples 30, 32, in the well known manner, include elongated portions 31, 33 and rearwardmost curved ear engaging portions 35, 37.

In accordance within the present invention, an electroluminescent light source 40 extends along, and is preferably embedded within, a perimeter extent of the frontal lens portion. As shown in FIG. 1, the electroluminescent light source is coextensive with the entire upper perimeter 23 of the frame. It should however be understood, as will subsequently be shown in conjunction with the other embodiments, that the present invention contemplates alternative placements of the electroluminescent light source along the perimeter of the eyeglass frame, which may also include portions of the side temples.

Electroluminescent light source 40 is in the form of a longitudinally extending flexible cable which incorporates a twisted pair of electrodes 41, 43, typically made of copper wire which may be 0.1–0.3 mm in diameter. It is covered with a layer of insulating lacquer 44 being twisted around each other, typically with a twisting pitch in the order of 8–10 turns per cm. The helical hollows formed between the twisted wires are filled with an electroluminescent material 45 which may typically comprise an electroluminophor powder dispersed in epoxy resin. The flexible transparent layer 46, which may typically be in the order of 2.5 mm diameter, is then encased about the electroluminescent light source. The resulting elongated product is compact, flexible and easily shapeable into different configurations. As is well known in the art, the color of the light which will be emitted by the electroluminescent light source 40 is significantly dependent on the type of electroluminophor powder 45 selected. As discussed in the aforementioned U.S. Pat. 5,485,335, different electroluminophor powders may typically principally emit red, green, or blue light when excited by an appropriate electrical source.

Figure 9:
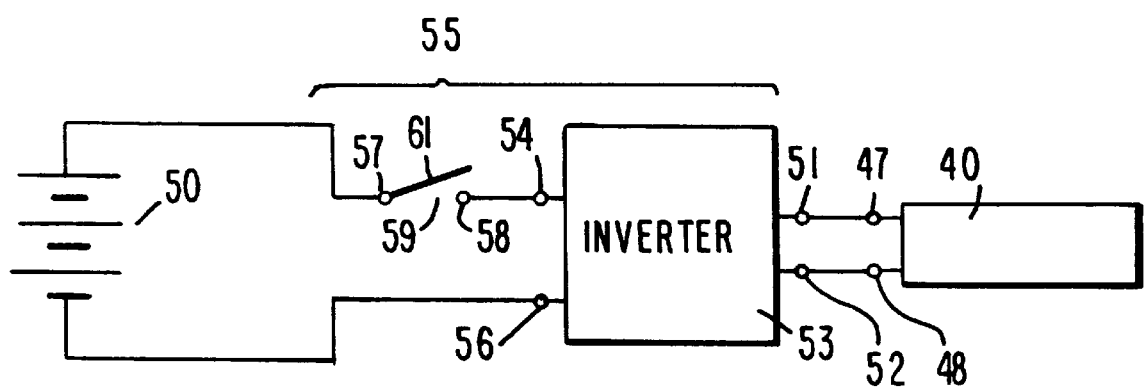
FIG. 9 is a typical circuit diagram showing the electrical connection of the electroluminescent light source and its voltage source.

In order to excite the electroluminescent light source 40, a voltage source is carried by the eyeglass frame, which includes battery 50 and inverter, switch combination 55. Battery 50 may typically be a 1.5 AAA battery. The inverter, switch combination is a compact assembly which may be obtained from Inverter Designs, Lancaster, Tex. 75134 and is approximately 2.5 cm×1.0 cm×1.0 cm. The electrical connection between the voltage source 50 inverter assembly 55 and electroluminescent light source 50 is typically shown in FIG. 9. Electroluminescent light source 40 includes terminals 47, 48, which are connected to output terminals 51, 52 of the inverter 53. The inverter 53 also includes input terminals 54, 56. Terminal 56 is connected to one of the poles of battery 50. The opposite pole of battery 50 is connected to terminal 57 of switch 59, with the other terminal 58 of the switch connected to input terminal 54 of the inverter. As shown in FIG. 9 the switch is in the off position, which corresponds to the electroluminescent light source 40 being in a non-luminescent condition. When the switch arm 61 contacts switch terminal 58, the electrical circuit to the electroluminescent light source 40 will be completed, resulting in the electroluminescent light source being in its luminescent condition. Referring back to FIG. 1, when the electroluminescent light source 40 is in its luminescent condition, it will provide a continuous light along a light emitting path, or region, which is coextensive with the upper perimeter of the frontal lens carrying frame portion 20.

Figure 7:
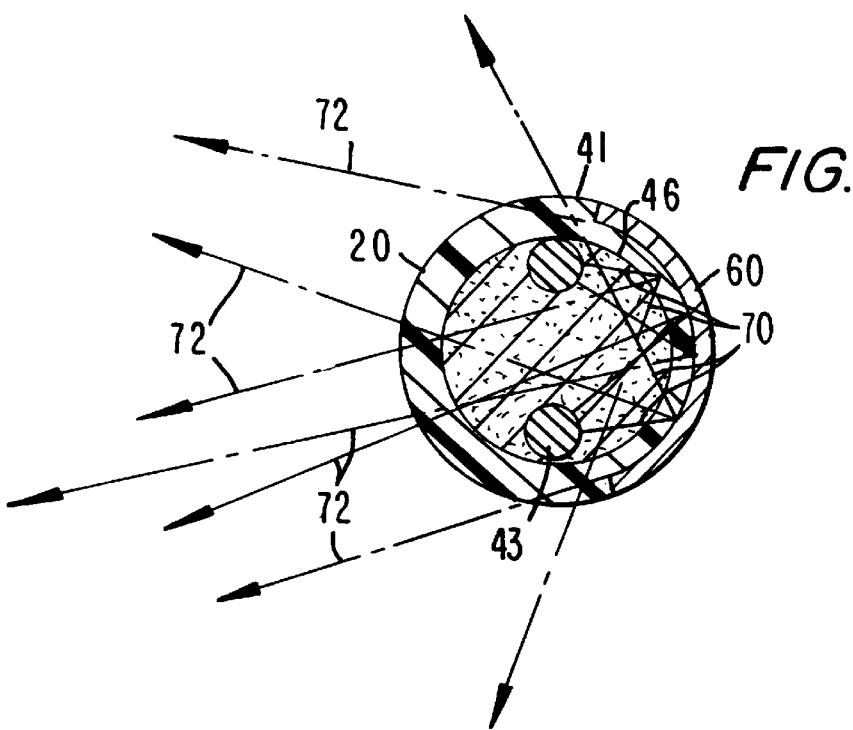
FIG. 7 is a cross-sectional view, corresponding to FIG. 3, but showing a modification thereof to include a reflective surface.

Referring to FIG. 7, the upper portion of the frame may be modified to include a reflective surface 60, adjacent to, or embedded therein. The reflective surface 60 may typically be formed of a mirror coating or metallic foil. When the electroluminescent light source is energized, the rays 70 which are directed rearward and will now be reflected and reversed by the reflective coating 60, as shown by 72, to augment the light being emanated from the forward portion of the electroluminescent light source. Thus, the addition of the reflective surface 60 increases the illumination provided by the electroluminescent light source when it is desired to utilize the illuminated eyeglasses to assist with night time reading, or under dim conditions. Further, by being projected forwardly, and away from the wearer's face, it will not disturb the wearer.

Figure 4:
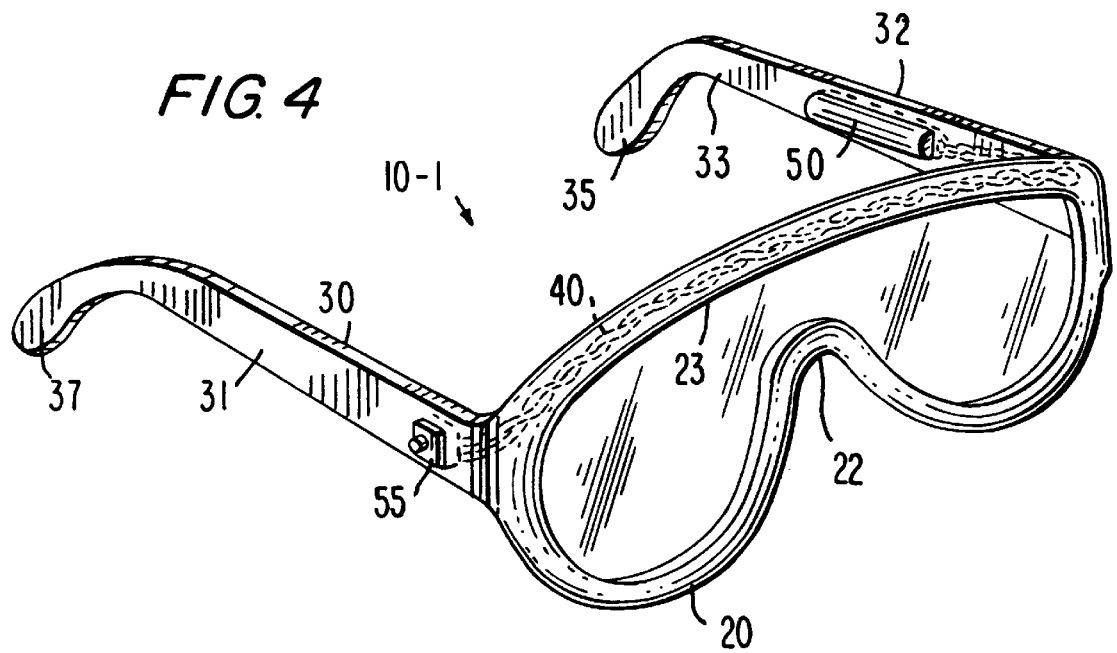
FIGS. 4–6 are perspective views of further embodiments in accordance with the present invention.

Reference is now made to FIG. 4 which showed a modified embodiment 10-1, and in which those components corresponding to FIG. 1 are indicated with the same numerals. This embodiment differs from the prior embodiment in that the battery 50 is now provided along the opposed side temple 32. Appropriate electrical connections are made through frame portion 23 such that the circuit will still correspond to that shown in FIG. 9.

Figure 5:
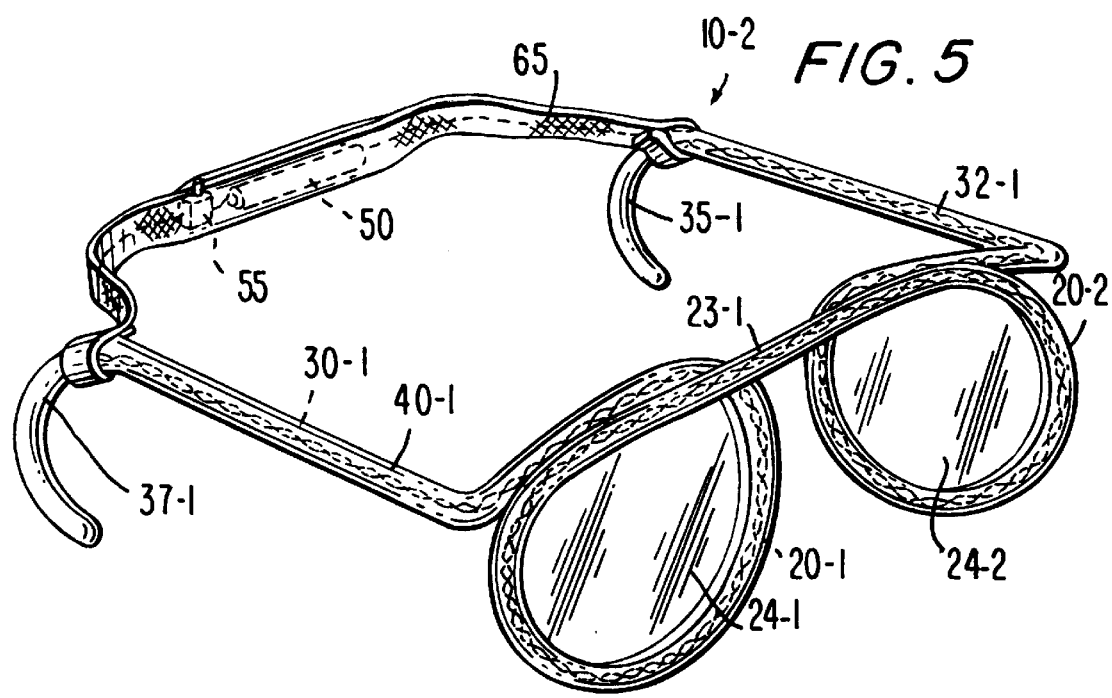

Reference is now made to FIG. 5 which shows still a further embodiment 10-2 of the present invention. The frontal lens carrying portion includes two separate sections 20-1 and 20-2. The bridge is defined by the juncture of upper frame member 23-1 and the inner peripheries of the lens carrying portions 20-1 and 20-2. The temples 30-1 and 32-1 are integrally formed with the frontal length carrying portions 20-1 and 20-2. The electroluminescent wire 40-1 continually extends through both side temple members 30-1, 32-1, and the entire periphery of the frontal lens carrying members 20-1, 20-2. It should thus be appreciated that the flexibility of the electroluminescent light source 40-1 permits it to be bent as shown so as to provide a continuous light source through the side portions of both temples 30-1, 32-1, and the entire frontal lens carrying portions 20-1, 20-2. A flexible strap 65 is connected between the temple side members 30-1 and 32-1. Flexible strap 65 serves a dual purpose. It contains the voltage source including battery 50 and inverter switch assembly 55, and retains the entire illuminated eyeglass frame assembly 10-2 on the wearer's head.

Figure 6:
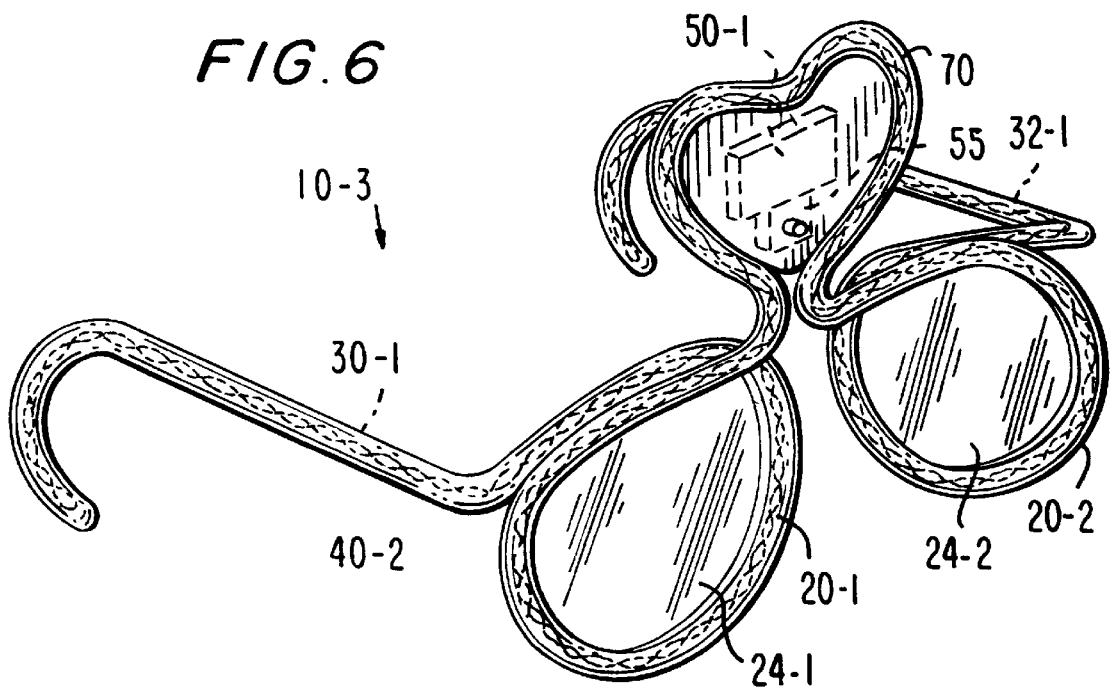

Reference is made to FIG. 6 which shows another embodiment 10-3. Illuminated eyeglass frame 10-3 has a modified frontal lens carrying portion that includes a generally heart shaped portion extending upwardly from the central region thereof. The heart shaped portion may include a battery 50-1 (which may be somewhat different than battery 50 in order to appropriately fit in within the area of the heart-shaped portion 70), and the inverter switch assembly 55. The electroluminescent light source 40-2 extends throughout the entire perimeter of the eyeglass frame, so as to provide a particularly intriguing entertainment effect.

Figure 8:
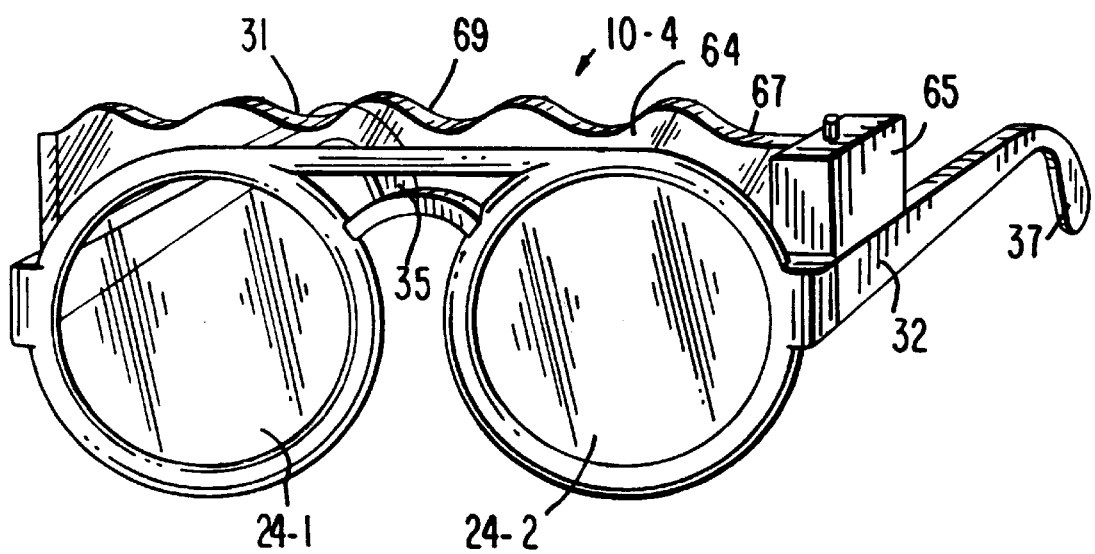
FIG. 8 is a perspective view of a further embodiment of the present invention.

Reference is now made to FIG. 8 which shows still a further embodiment 10-4. The frontal lens carrying portion includes a top spanning member 64 which has the electroluminescent light source (not shown) embedded therein. Spanning section 64 may preferably also include a reflective surface adjacent its rearmost side 69 which will be functionally equivalent to the surface 60 shown in FIG. 7, such that when the electroluminescent light source is illuminated, all of its light rays will be forwardly directed to maximize the forward illumination and avoid wearer disturbance which could result if rearward rays are directed towards the wearer's face. The voltage source assembly 65 contains the battery, inverter, and annual switch. If desired, the upper edge 67 of spanning member 64 may include scalloping for an improved visual effect. Member 64 will be formed of transparent or translucent material.

While preferred embodiments of the present invention have been described in detail, various modifications, alterations and changes may be made thereto without departing from the spirit and scope of the present invention, as defined by the following claims.

I claim:

1. An eyeglass frame comprising:
    a frontal lens carrying portion and a pair of side temples extending rearward from the opposed ends of said frontal portion;
    an elongated, flexible electroluminescent light source extending along a perimeter extent of said eyeglass frame including at least an extent of said frontal lens carrying portion, to define a light emitting region;
    a voltage source carried by said eyeglass frame adapted to energize said electroluminescent light source;
    a manually operable switch means carried by said eyeglass frame and electrically connected between said voltage source and said electroluminescent light source;
    said switch means having an off portion, corresponding to said electroluminescent light source being in a nonluminescent condition, and an on portion, corresponding to said electroluminescent light source being in a luminescent condition;
    said electroluminescent light source illuminated condition characterized as its entire length providing continuous illumination along said light emitting region.

2. An eyeglass frame according to claim 1, wherein said light emitting region includes the entire frontal lens carrying portion.

3. An eyeglass frame according to claim 2, wherein said electroluminescent light source is embedded within said frame.

4. An eyeglass frame according to claim 1, wherein said light emitting region also including at least a portion of each of said side temples.

5. An eyeglass frame according to claim 1, wherein said light emitting region includes the entire frontal lens carrying portion and at least a major portion of each of said side temples, whereby said illuminated condition provides continuous illumination throughout the entire perimeter of said frontal lens carrying portion and at least a major portion of each of said side temples.

6. An eyeglass frame according to claim 5, wherein said light emitting region includes substantially the entire extent of said side temples.

7. An eyeglass frame according to claim 6, wherein said frame includes curved and generally linear perimeter portions, with said electroluminescent light source flexibly conforming to said curved and generally linear portions, to provide continuous light over substantially the entire perimeter of said frame.

8. An eyeglass frame according to claim 7, wherein said electroluminescent light source is embedded within said frame.

9. An eyeglass frame according to claim 5, wherein said electroluminescent light source is embedded within said frame.

10. An eyeglass frame according to claim 1, wherein said voltage source includes a battery and an invertor.

11. An eyeglass frame according to claim 10, wherein one of said side temples includes a receptacle for said battery, and said invertor and switch means are carried by said one temple.

12. An eyeglass frame according to claim 10, wherein each of said side temples including a front end connected to said frontal lens carrying portion and a rear end including ear engaging elements, a flexible transverse connector extending between the rear ends of said pair of side temples, and said flexible transverse connector including said battery, invertor and switch means.

13. An eyeglass frame according to claim 12, wherein said electroluminescent light source is embedded within said frame.

14. An eyeglass frame according to claim 1, further including a reflective surface embedded within at least a portion of the frame frontal lens portion which is coextensive with said electroluminescent light source; said electroluminescent light source having opposed forward and rear surfaces, said reflective surface being adjacent to and rearward of said rear surface, such that the light rearwardly emitted by said electroluminescent light source toward said reflective surface is reversed by said reflective surface and forwardly directed towards the front surface of said frame.

15. An eyeglass frame according to claim 14, wherein said light emitting region includes substantially the entire frontal lens carrying portion.

16. An eyeglass frame according to claim 1, wherein said electroluminescent light source is embedded within said frame.

* * * * *